Patented July 24, 1951

2,561,439

UNITED STATES PATENT OFFICE 2,561,439

METHOD OF TREATING LITHIFEROUS ORES TO RECOVER LITHIUM AS LITHIUM CHLORIDE

Hendrik de W. Erasmus, Lewiston, N. Y., assignor, by mesne assignments, to Union Carbide and Carbon Corporation, a corporation of New York No Drawing. Application July 8, 1947, Serial No. 759,701

5 Claims. (Cl. 23—27)

1

The invention relates to the recovery of metal values from ores and more particularly to the recovery of lithium from lithiferous ores, for example, spodumene ore.

One method presently being practiced in the recovery of lithium from ore comprises admixing spodumene ore, (a lithium-aluminum silicate) with lime and calcium chloride, heating the mixture to reaction temperatures in a fuel-fired furnace and evaporating the lithium chloride formed by the reaction into the products of combustion, from which the lithium chloride is then recovered. A rotary kiln is employed for the furnacing treatment and a suitable precipitator is used to condense the lithium and other metal chloride vapors.

Although this method of treatment has been long known, certain operational difficulties encountered in its practice render the method commercially unattractive. For example, it is necessary to exclude hydroxides and water vapor from the kiln, as these substances in the presence of silica hydrolyze the calcium chloride to produce hydrochloric acid with consequent serious corrosion of metal equipment. Hence, the kiln must be fired with a fuel of low hydrogen content in order to avoid excessive consumption of calcium chloride by such hydrolysis.

The principal object of the present invention is to provide a novel, simple, and efficient process whereby lithium may be recovered from lithiferous ores as lithium chlorides without the disadvantages inherent in heretofore known procedures.

In general, the process of the invention comprises mixing and pelleting comminuted lithiferous ore, or its concentrates, and anhydrous calcium chloride, heating the pellets to reaction temperature in a suitable furnace under reduced pressure, and condensing the vapors. The condensate may be purified, preferably by fusing it with soda ash or caustic soda to convert the chlorides of the heavy metals and alkaline earth metals into their carbonates or hydroxides, crushing the fused cake, leaching the crushed material with an appropriate solvent, for example alcohol, and recovering the lithium chloride by evaporation of the solvent.

When calcium chloride is heated in vacuo with a lithiferous ore, as spodumene ore, particularly in the presence of an acidic compound such as silica (a natural component of spodumene ore), an exchange of chlorine takes place, and lithium chloride is formed. Since the vapor pressure of calcium chloride is extremely low even at high temperatures, the reaction will continue until the

2 chlorides of lithium and any other base-forming metals present in spodumene ore, with the exception of calcium, are volatilized from the reaction zone. These volatile chlorides may be condensed and the alkali-, alkaline earth-, and other metal-chlorides removed from the condensate to produce a lithium chloride of high purity.

In view of the low lithium content of spodumene ore, usually not over 7% lithia, it is advantageous to separate the spodumene from attendant gangue prior to the vacuum treatment. One known method, particularly adaptable for use with the present invention, comprises decrepitating the ore at temperatures between 1050 and 1200° C., pulverizing the decrepitated ore and separating, by screening or other particle size separation methods, the pulverulent spodumene from silica (quartz) and feldspar, which latter constituents remain unaltered by the previous heating. Although the method of the invention may be used with spodumene ores not beneficiated by the decrepitation treatment, it has been observed that the decrepitated and beneficiated ores are enhanced in their reactivity and as a consequence of such enhanced reactivity lower vacuum-furnacing temperatures may be employed in the method of the invention.

For instance, in an experiment three parts of decrepitated ore were mixed with one part of anhydrous calcium chloride, to give an initial lithium content in the charge of 1.645%. This was charged in a cold furnace, brought to a soaking temperature of 775° C., and held for two hours. The temperature was then raised to 915° C. and held for three hours, at an average absolute pressure of 50 microns of mercury. The residue was found to contain 0.32% lithium, 84.1% of the contained lithium having been evolved from the charge.

According to the invention, natural or decrepitated lithiferous ore or concentrate is dried and comminuted to pass through a 200 mesh screen (0.003 inch openings) and pelleted with finely divided anhydrous calcium chloride. The pellets are then charged into a suitable vacuum furnace and slowly heated to a temperature between 800° and 1200° C. at a pressure of less than 20 mm. mercury absolute, and the volatilized products condensed and collected.

Any of several methods may be employed to separate lithium chloride from the condensate. For example, the crude condensate may be leached with an appropriate solvent, e. g. alcohol, to remove lithium chloride as the solute. Iron and alkaline earth chlorides, and colloidal iron compounds as well as traces of alkaline earth and heavy metal hydroxides sometimes follow through the alcohol extraction. These compounds may be precipitated by an addition of sodium ethylate to the solute and then separated by decantation or otherwise. In the leaching operation it is necessary that the condensate be anhydrous. If the condensate has absorbed moisture, it should be crushed and then dried under reduced pressure at a temperature not exceeding 225° C. Higher drying temperatures should be avoided as such temperatures may effect the formation of undesirable eutectics between compounds in the condensate.

An alternative and preferred method for separating lithium chloride from other metal chlorides in the crude condensate comprises fusing the condensate with a quantity of a basic reagent such as soda ash or caustic soda sufficient to convert the alkaline-earth and heavy metal chlorides to alcohol insoluble carbonates or oxides. The basic reagent combines preferentially with calcium-, iron-, and other heavy metal-, and alkaline earth chlorides in such manner that upon extraction with alcohol, lithium is recoverable as an alcoholic lithium chloride solution. This solution may then be evaporated and the resulting lithium chloride alcoholate crystals heated to temperatures above the boiling point of alcohol to form anhydrous lithium chloride. Should any lithium values remain in the residue after the alcohol extraction, these may be recovered by leaching the residue with water and precipitating the dissolved lithium compounds by an addition of sodium carbonate, -phosphate, -fluoride, or -silicate.

In practice, the method of the invention yields high lithium recoveries. In one example, 100 parts of comminuted natural spodumene ore, containing only 1.20% lithia, were pelleted with 25 parts of anhydrous calcium chloride, and treated according to the following temperature-time-pressure cycle:

1050° C. for 3 hours at 5 mm. mercury pressure
1100° C. for 3 hours at 5 mm. mercury pressure
1150° C. for 5 hours at 2.5 mm. mercury pressure The volatile products of the reaction were condensed and contained, as lithium chloride, 96.5% of the lithium in the treated ore.

In another example 100 parts of comminuted decrepitated spodumene ore, containing 4.71% lithia, were mixed with 33 parts of anhydrous calcium chloride and treated as below:

1. Heated to 825° C.;
2. Pressure reduced to 5.0 mm. mercury and temperature raised at a rate of approximately 25° per hour to 1150° C.;
3. Pressure reduced to 0.5 mm. mercury and heated at 1150° C. for 12 hours.

In this example the condensed vapors contained 98.5% of the lithium originally present in the ore.

Although the method of the invention has been described in detail only in its application to the treatment of lithium ores, it has been found that it may also be employed in the treatment of caesium and rubidium ores, for example, pollucite and related ores, for the recovery of caesium.

The practice of the method of the invention is not limited to any specific design of vacuum heating furnace. One furnace, however, that has been found to be particularly suitable for the practice of the invention is described in U. S. Patent 2,386,189 issued to Glen D. Bagley.

I claim:

1. Method of treating lithiferous ores to recover lithium as lithium chloride which comprises mixing comminuted lithiferous ore and calcium chloride, heating said mixture at a temperature between 800° C. and 1200° C. at a pressure of less than 20 mm. mercury absolute, and condensing and collecting volatile lithium chloride.

2. A method as claimed in claim 1 in which the mixture of comminuted lithiferous ore and calcium chloride is pelleted prior to heating under reduced pressure.

3. A method as claimed in claim 1 in which silica is added to the mixture of comminuted lithiferous ore and calcium chloride to increase the proportion of refractory acidic oxide.

4. Method of treating spodumene ore to recover lithium as lithium chloride which comprises mixing and pelleting comminuted spodumene ore and calcium chloride; charging said pellets into a vacuum furnace, heating said furnace to a temperature of about 1150° C. and maintaining said temperature for the duration of the reaction period; maintaining a reduced pressure between about 0.5 mm. and 5.0 mm. of mercury absolute in said furnace during said reaction period; collecting and forming a condensate of the volatile metal chlorides formed during said reaction period; and crushing and leaching said condensate with alcohol to recover lithium chloride in the solute.

5. Method as claimed in claim 4 wherein said condensate is fused with a quantity of basic reagent sufficient only to form alcohol insoluble metal compounds of metal values in said condensate other than lithium and crushing and leaching said fused condensate with alcohol to recover an alcoholic lithium chloride solution; evaporating said solution and heating the residue to form anhydrous lithium chloride.

HENDRIK DE W. ERASMUS.

REFERENCES CITED

The following references are of record in the file of this patent:

UNITED STATES PATENTS

| Number | Name | Date |
|---|---|---|
| 1,250,291 | Ellis | Dec. 18, 1917 |
| 1,392,044 | Booth | Sept. 27, 1921 |
| 1,515,001 | Girsewald | Nov. 11, 1924 |
| 1,936,002 | Waggoner et al. | Nov. 21, 1933 |
| 2,022,003 | Kepper et al. | Nov. 26, 1935 |

OTHER REFERENCES

Bureau of Mines (Reports) No. 3344, 1937, pages 4, 7 and 8.

Bureau of Mines I. C., 7054, Feb. 1939, pages 9 and 10.